Dec. 29, 1970         G. GAZUIT         3,550,196
TIRE VULCANIZING APPARATUS
Filed Jan. 30, 1967                        4 Sheets-Sheet 1

INVENTOR
GEORGES GAZUIT

BY Oberlin, Maky & Donnelly
ATTORNEYS

INVENTOR
GEORGES GAZUIT

BY Oberlin, Maky & Donnelly
ATTORNEYS

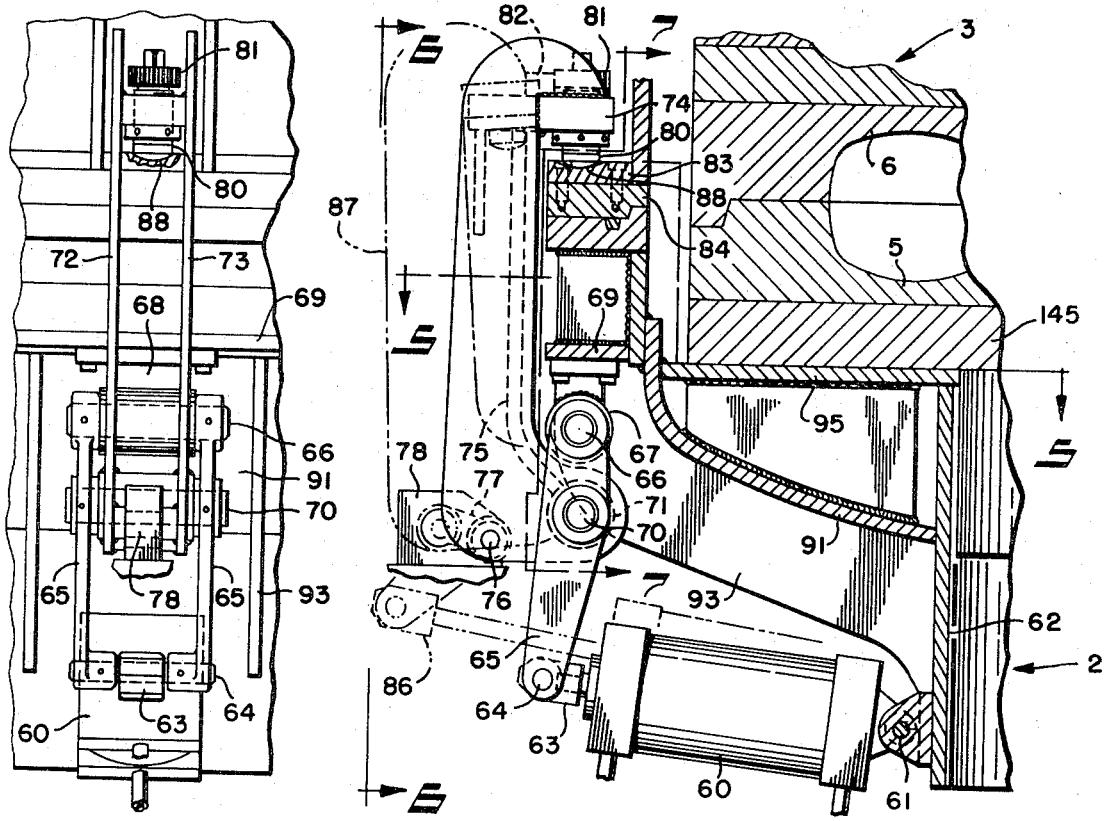
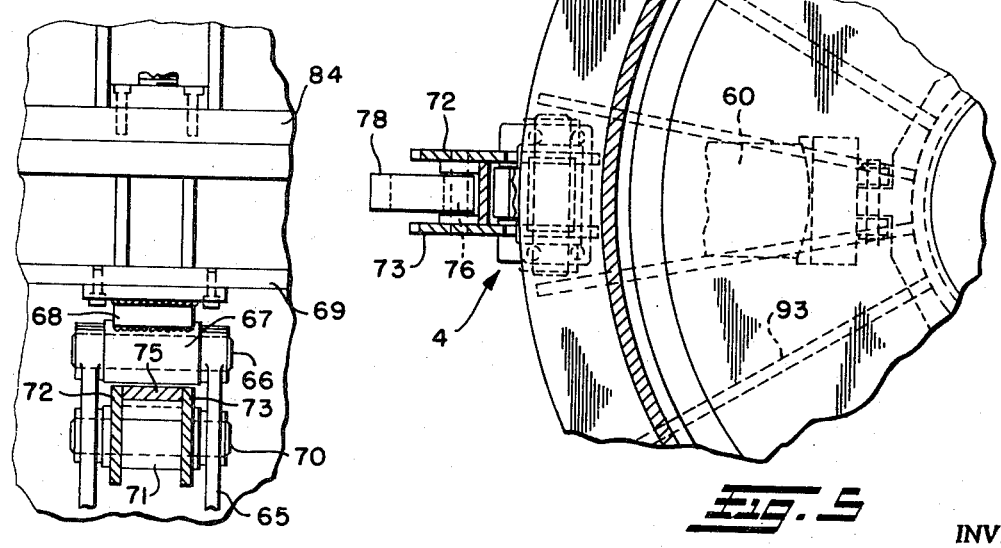

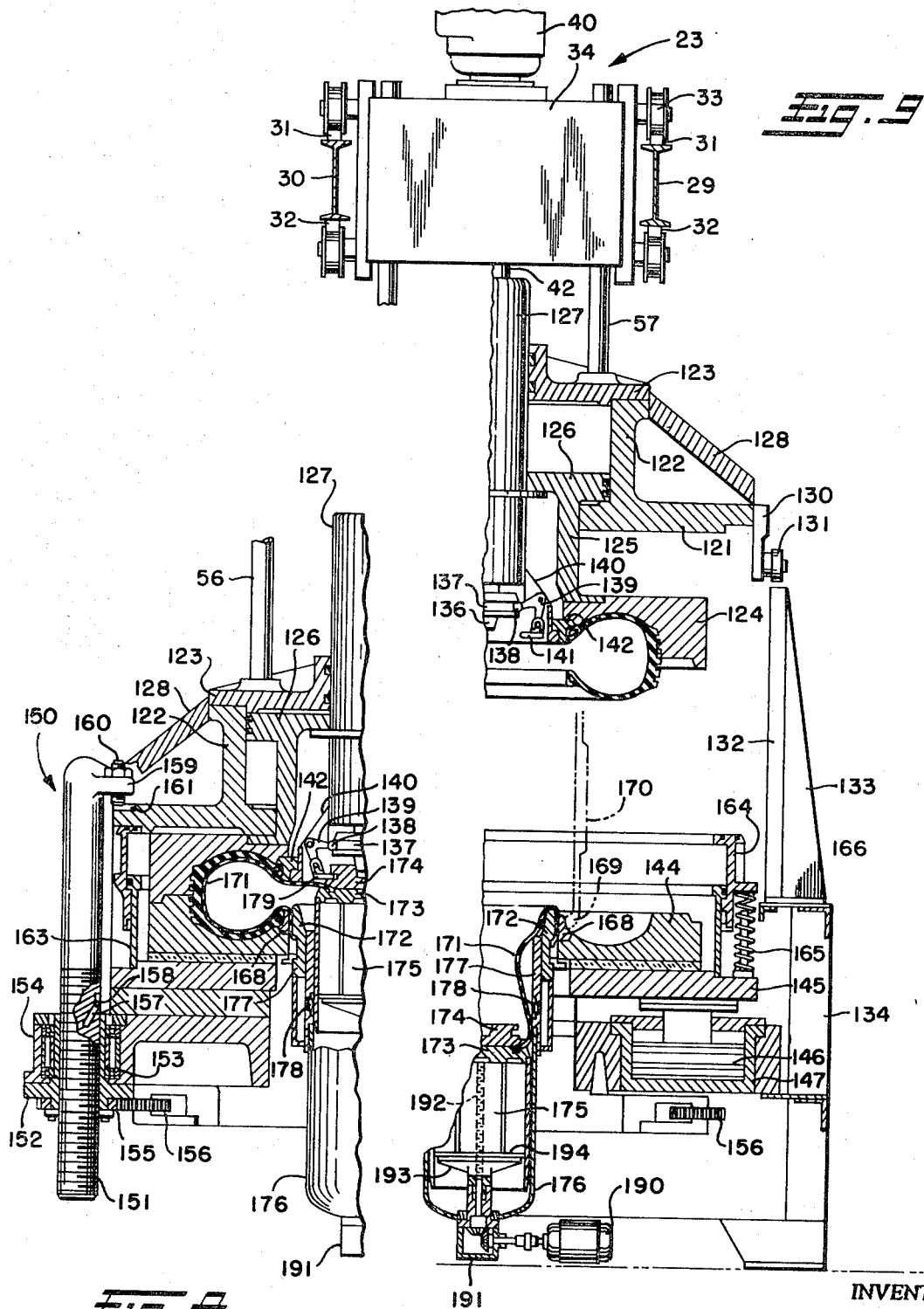

United States Patent Office 3,550,196
Patented Dec. 29, 1970

3,550,196
TIRE VULCANIZING APPARATUS
Georges Gazuit, Montlucon, France, assignor, by mesne assignments, to NRM Corporation, a corporation of Ohio
Filed Jan. 30, 1967, Ser. No. 612,391
Int. Cl. B29h 5/08
U.S. Cl. 18—4                        9 Claims

ABSTRACT OF THE DISCLOSURE

Tire curing apparatus utilizing an arrangement of presses which comprise separable top and bottom mold sections, a frame capable of traversing each of the presses with a carriage mounted on the frame which includes a mechanism for raising and lowering the top mold section and moving such section when raised laterally of the bottom mold section, the cured tire being carried with the top mold section for discharge laterally of the bottom mold section, such mechanism simultaneously with the lateral movement of the top mold section moving a green tire into position to be placed in loading position with respect to the bottom mold section.

---

This invention relates generally as indicated to tire vulcanizing apparatus and more particularly to the improved more economical shaping and vulcanizing of tires.

Conventional tire curing presses generally comprise side-by-side top and bottom mold sections which when closed form a mold cavity. The top mold sections are carried by a horizontal beam which is raised and lowered and moved laterally by large bull gears and links at the sides of the press. The links are attached to the press head through pivots which ride in guides in large vertical side plates. The press head may additionally carry a loader mechanism which will place a green tire properly loaded in the bottom mold section as the upper mold section carries the cured tire therewith laterally clear of the bottom mold section. Reference may be had to U.S. Pat. No. 3,065,499 or 3,097,394, for illustrations of tire curing presses of the type above-noted. Such presses are currently manufactured and sold in large number by NRM Corporation of Akron, Ohio.

It can readily be seen that with such conventional presses, each press is provided with its own opening and closing mechanism which includes the large bull gears, the links connected to the press head, the beam supporting the upper or top mold sections, and the heavy vertical side guide plates. These mechanisms not only open and close the press, but also maintain the press or mold sections securely closed or clamped together during the high pressure vulcanizing portion of the curing cycle. The opening, closing, and clamping mechanisms of the press thus constitute a substantial portion of the workings of the press and in the case of large size tires, each press must include massive beams, links, bull gears, and attendant drives which, of course, makes such presses bulky, heavy, difficult to manufacture, ship and install. Accordingly, a tire curing press which would not require the massive opening, closing, and clamping mechanisms would be much more economical.

Also, in the curing of large size tires, hot water under pressure is usually provided in the shaping bladder whereas on smaller presses for passenger tires, curing is usually done by steam. One of the most economical and simple types of bladder shaping mechanisms is the type wherein the bladder is invaginated into a well in the lower mold section when the press is opened. When hot water is used inside the bladder in the curing of larger tires, the hot water, of course, also fills the well and this entails a larger volume of hot water than is actually required for the vulcanization. Accordingly, it is highly desirable to maintain the advantages of the bladder and well operation, but still to be able to obturate the well from the interior of the tire cavity during the application of hot water at pressure.

It is accordingly a principal object of the present invention to provide tire curing presses not requiring individual mold opening and closing mechanisms.

Another principal object is the provision of a single opening, closing and loading mechanism which can be used by a plurality of tire presses.

A still further object is the provision of apparatus for the vulcanizing of tires which is of a simplified and more economical construction.

Yet another object is the provision of an overhead crane of special construction including means automatically to load and unload simultaneously a tire curing press.

A yet further object is the provision of a process for curing tires, especially large size tires, more economically than heretofore possible.

Other objects and advantages of the present invention will become apparent as the following description proceeds.

To the accomplishment of the foregoing and related ends, the invention, then, comprises the features hereinafter fully described and particularly pointed out in the claims, the following description and the annexed setting forth in detail certain illustrative embodiments of the invention, these being indicative, however, of but one of a few of the various ways in which the principles of the invention may be employed.

In said annexed drawings:

FIG. 4 is an enlarged fragmentary vertical section illustrating a preferred form of mold clamp;

FIG. 5 is a fragmentary horizontal section taken substantially on the line 5—5 of FIG. 4;

FIG. 6 is a fragmentary elevation taken substantially from the line 6—6 of FIG. 4;

FIG. 7 is a fragmentary vertical section taken substantially from the line 7—7 of FIG. 4;

FIG. 8 is a fragmentary vertical section through a tire mold illustrating a slightly modified form of press construction; and FIG. 9 is a fragmentary vertical section similar to FIG. 8 illustrating the press of FIG. 8 in its opened position.

Figure 1:
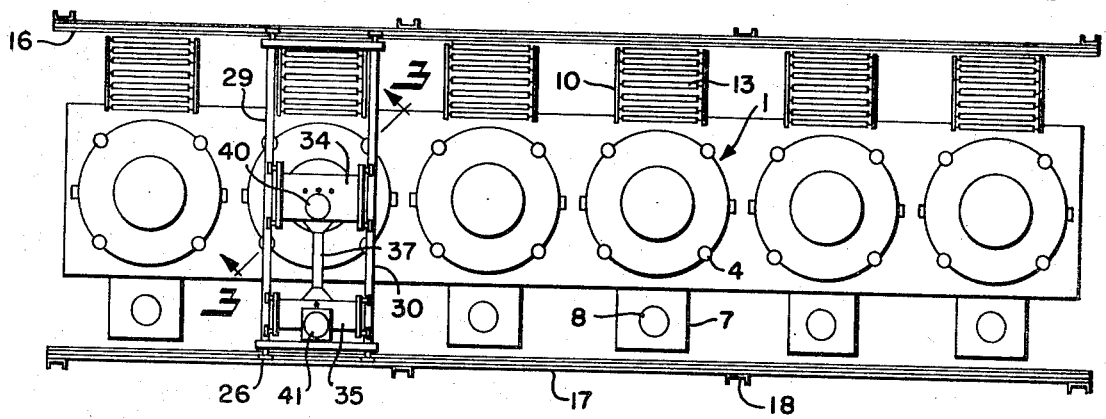
FIG. 1 is a top plan view of apparatus in accordance with the present invention.
Figure 2:
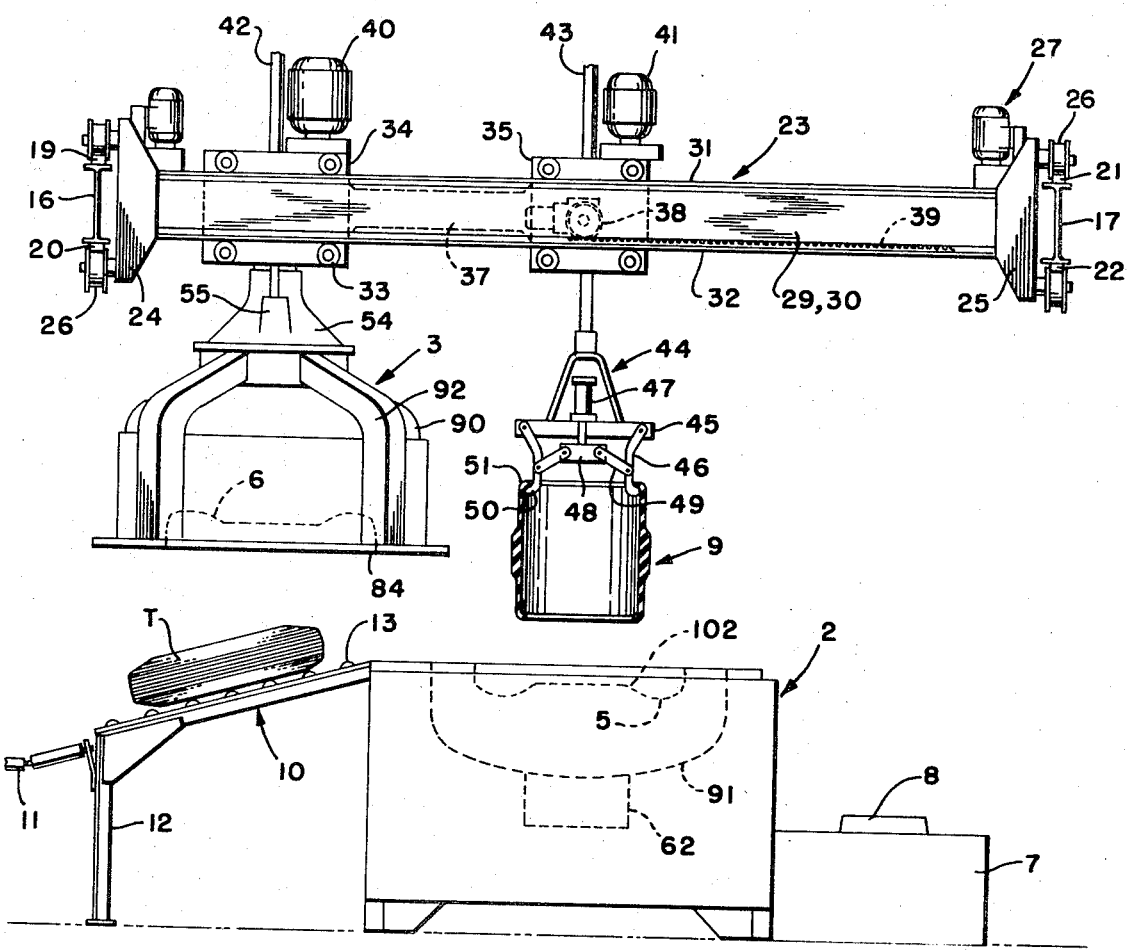
FIG. 2 is an enlarged transverse section of the apparatus shown in FIG. 1.

Referring now to the annexed drawings and more particularly to FIGS. 1 and 2, it will be seen that a plurality of tire presses 1 may be arranged in a row with the centers thereof aligned and each comprises a base 2 and a separable head 3. The base and head may be clamped together by four quadrant spaced clamps shown schematically at 4 and the base will carry the lower of bottom half of the tire mold section shown at 5 while the head will carry the complemental upper or top half of the mold section shown at 6 which when the base and head are clamped together form the complete tire mold. As seen in FIG. 2, the press may be of the steam dome type wherein the complementary mold sections are housed in pressure vessels through which steam is circulated to effect the curing of the tire.

At the front of each press there is provided a loading platform 7 provided with a pilot 8 over which a tire carcass 9 may be positioned preparatory for loading into the press. At the opposite side of the press there is provided a discharge conveyor 10 downwardly inclined toward a belt or like conveyor 11 travelling normal to the plane of FIG. 2. The conveyor 10 is mounted on a stand 12 and may include a plurality of rollers 13 onto which the tire T is discharged from the press head 3.

Extending parallel to the alignment of the presses there are provided two structural beams 16 and 17 which may be supported by columns 18 and the top and bottom of the beams are provided with rails, i.e., 19 and 20 for the beam 16, and 21 and 22 for the beam 17. Mounted for movement along such rails is an overhead crane shown generally at 23.

The crane 23 includes two end members or carriages 24 and 25 from which project flanged wheels 26. Each end member includes four such wheels, two riding on the top rails 19 or 21 and two on the bottom rails 20 or 22. Two-speed motor drive units 27 may be provided for the flanged wheels 26 riding on the top rails 19 and 21 to propel the crane 23 along such rails. Accurate positioning of the crane may be obtained by limit switches positioned along the rails 19 so that the crane can be stopped automatically precisely over the center of each of the presses 1.

Extending between the end members 24 and 25 are two I-beams 29 and 30 which may be similar to but somewhat smaller than the beams 16 and 17. Each of the transverse beams 29 and 30 is provided with rails on the top and bottom as shown at 31 and 32 on which ride the flanged wheels 33 of carriages 34 and 35. The carriages 34 and 35 are interconnected by a fixed link 37, which, however, can be adjusted as to length to control the spacing of the carriages 34 and 35. In any event the carriages 34 and 35 will move back and forth along the beams 29 and 30 as a unit. Such movement may be obtained by a motor driven pinion 38 in mesh with rack 39 mounted on one of the beams 29 or 30.

Each carriages 34 and 35 includes a drive unit as shown at 40 and 41 for moving vertically lifting rods 42 and 43, respectively. The drive involved may be a conventional screw or rack type elevator mechanism. The rod 43 for the carriage 35 is secured to a loading mechanism 44 which includes a cross-shape frame 45 to which are pivoted fingers or shoes 46 actuated by piston-cylinder assembly 47 mounted on the top of the frame 45. The rod of the piston-cylinder assembly 47 is connected to an actuator 48 which is in turn connected by links 49 to the respective fingers or shoes 46. Retraction of the piston-cylinder assembly 47 will cause the fingers to pivot inwardly and conversely, extension will cause the fingers to pivot outwardly. The fingers are provided with out-turned bottom edges shown at 50 to fit beneath the upper bead 51 of the tire band 9.

Figure 3:
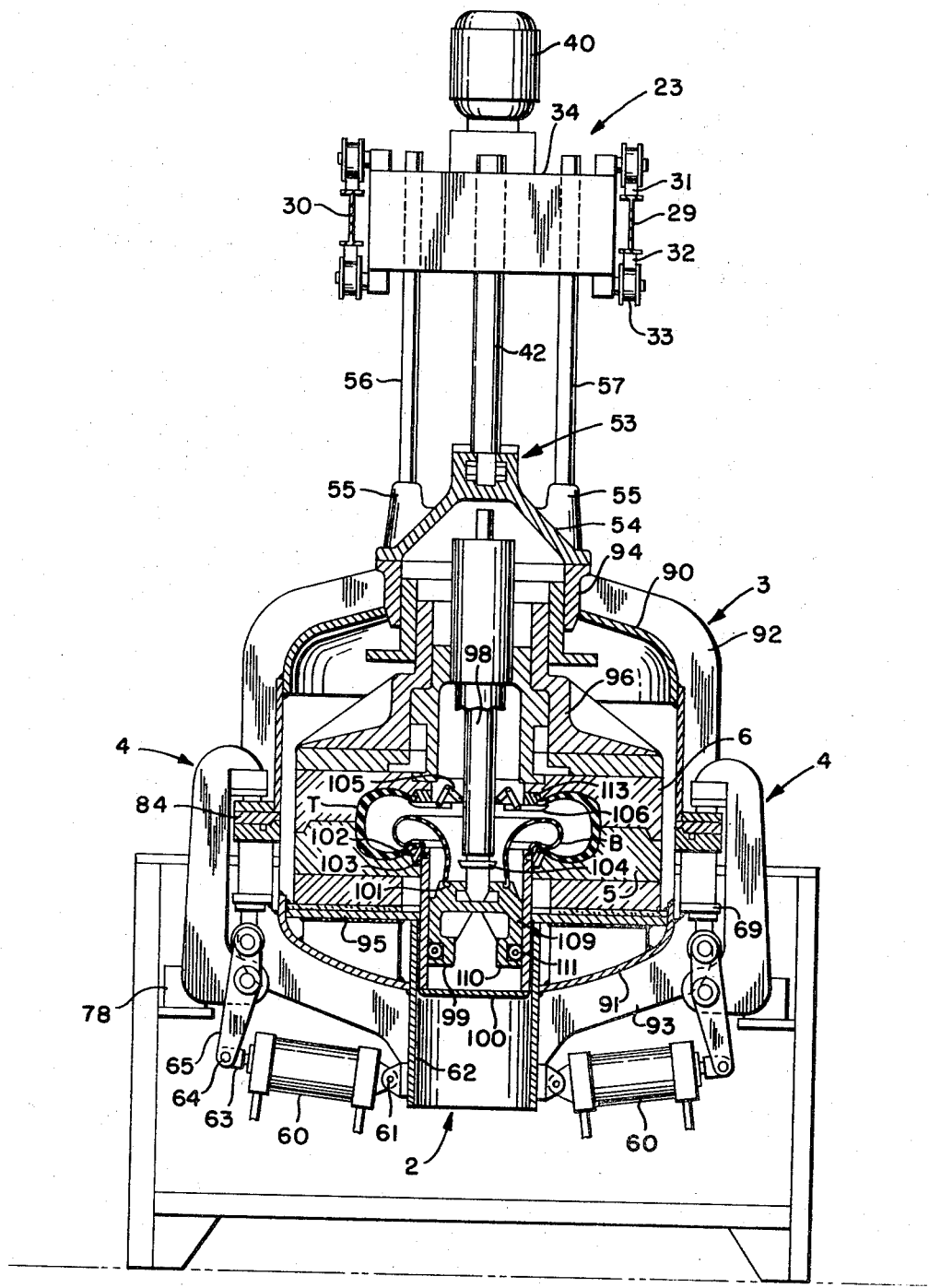
FIG. 3 is a further enlarged fragmentary vertical section taken substantially on the line 3—3 of FIG. 1.

As seen perhaps more clearly in FIG. 3, the elevator rod 42 of the carriage 34 may be extended and connected with the press head 3 through the bayonet lock shown schematically at 53. For the purpose of connecting the elevator rod 42 to the press head 3, there is provided on the top of the head a conical member 54 which also includes receptacles 55 to receive guide rods 56 and 57 which move downwardly with the elevator rod 52. The guide rods 56 and 57 fit in sockets in the receptacles 55 and keep the press head 3 from rotating as it is raised and lowered by the drive unit 40.

The lateral spacing of the elevator rods 42 and 43 as controlled by the fixed link 37 is equal to the lateral spacing of the axis of the pilot 8 and the bottom mold section 5. In this manner the crane 23 can move along the tracks 19–22 to position itself automatically over the selected press 1 at the conclusion of the vulcanizing portion of the press cycle. The motor driven pinion 38 will have been actuated to shift the carriages 34 and 35 as seen in FIG. 2 to the right to position the motor unit 44 over the band 9 placed upon the pilot 8. This simultaneously places the elevator rod 42 of the carriage 34 over the center of the press head.

The elevator rods are then extended downwardly with the piston-cylinder assembly 47 of the loader 44 retracted. At the right vertical height, the assembly 47 is extended causing the fingers to engage beneath the upper bead 51 of the tire band 9. As the elevator rod 42 is lowered, it is attached to the press head. At this point, the particular press over which the crane 23 is situated is ready to be opened, the cured tire therein discharged, and a new green tire band loaded therein. Before this can be accomplished, however, the press head must be unclamped from the press base.

Referring now more particularly to FIGS. 4–7, it will be seen that each of the clamps 4 is operated by its own hydraulic piston-cylinder assembly 60, the blind end of which is pivoted at 61 to the cylindrical housing 62 of the well of the base 2. The rod 63 of the assembly 60 is connected at pin 64 to links 65 which extend upwardly to pin 66 which is mounted in sleeve 67 supported by boss 68 from the underside of the peripheral frame plate 69 of the base 2. The links 65 are also interconnected by pin 70 which extends through sleeve 71 interconnecting the lower ends of L-shape clamp plates 72 and 73, the upper ends of which extend over and are welded to the clamping block 74. Stiffening webs 75 may be provided between the plates 72 and 73 and a pin 76 is provided between such plates at the lower elbow end thereof which cooperates with a cam slot 77 in block 78 fixed to the base 2.

The clamping block 74 is provided with an adjustable clamping element 80, the latter being threaded into the block 74 so that rotation thereof will vertically adjust its slightly rounded lower end. A locking gear 81 is provided on the top of the clamping element and a lock member 82 may be secured in mesh with such gear to hold the element in its adjusted position. The elements 80 cooperate with slight concavity in the upper surface of wear block 83 mounted on the peripheral flange 84 of the press head 3.

The flange 84 cooperates with a similar peripheral flange 85 on the base 2 to close and seal the head to the base. The head, of course, carries the upper mold section 6 which joins with the lower mold section 5 to form the completed tire mold cavity when the press is closed. In the illustrated embodiment, the base and press head may join to form in effect an autoclave or steam chamber for the circulation of heating medium about the molds. Other types of presses using platens to apply the heat necessary for vulcanization to the mold sections may be used, but nonetheless a large clamping force is required to maintain the upper and lower mold sections together during the vulcanization of the tire due to the high pressures applied within the shaping bladder within the tire during curing.

In operation of the clamps, the rods of the hydraulic piston-cylinder assemblies 60 may be extended to the phantom line positions indicated at 86 rocking the links 75 outwardly about the pins 66. This moves the lower pins 70 of the clamping plates 72 and 73 in an arc about the centers of the pins 66 to raise the clamping elements 80 from the concavities in the wear plates 83. The pins 76 ride in the slots 77 causing the upper ends of the clamp plates 72 and 73 to move backwardly to the phantom line position indicated at 87 in FIG. 4. This clears the clamp block 74 laterally of the flange 84 of the press head 3 so that the latter may be lifted clear.

It is noted that the clamp provides a three-pivot toggle linkage with the upper pivot being the point 88 of contact between the clamping element 80 and the concavity in the block 83, the middle pivot being the pin 66 while the lower pivot is the pin 70. When the center of the pin 70 moves to the right of the vertical line through the point 88 and the center of pin 66, only actuation of the hydraulic piston-cylinder assembly 60 can release the clamp. Electrical signalling devices may be employed to indicate that each clamp 4 is in the overcenter or locked position and this may then prepare the circuit for the commencement of the vulcanizing portion of the press cycle which, in large tire presses may develop forces tending to separate the base and press head of approximately six or seven hundred tons.

As seen in FIGS. 3 and 4, for example, the base 2 and head 3 include annular opposed dome structures 90 and 91 with radially extending gussets being provided as indicated at 92 for the head 3 and 93 for the base 2. The gussets for the base extend from the well wall 62 to the peripheral frame member 69 while the gussets 92 for the head extend from the annular cap 94 on which the frustoconical member 54 is secured to the peripheral flange 84. The lower mold section 5 is supported on platform 95 while the upper mold section 6 is suspended from bolster 96.

Referring now to FIG. 3, the press is illustrated at the completion of the vulcanizing cycle and just prior to opening. A plunger 98 mounted for vertical reciprocation in the press head 3 has extended engaging bladder piston 99 pushing the latter down into the bottom of the well 100. This causes the bladder B to be stripped from the interior of the tire T since the bladder is secured at one end to the bladder piston as indicated at 101 and at its opposite end to the upper end of the well 100 adjacent the lower toe ring 102 as indicated at 103. The plunger 98 is provided with an annular groove 104 which when the plunger descends pivots bell cranks 105 causing chuck plates 106 to move radially beneath the upper bead of the tire. Reference may be had to the aforementioned Pat. 3,097,394 for a more detailed disclosure of a plunger or ram operated tire chuck of the type illustrated.

It is noted that the bladder piston 99 mounted for vertical sliding movement in the well 100 is provided with a peripheral skirt 109 which includes an annular channel 110 at the lower end thereof having therein an inflatable sealing member 111. The sealing member 111 will be inflated when the piston 99 is in its uppermost position effectively blocking the entry of hot water under pressure into the well 100 when the bladder B is pressurized during the vulcanizing of the tire. This, of course, limits the amount of hot water required during the vulcanization of the tire to the tire cavity itself and avoids requiring that the well 100 also be filled.

When the plunger 98 has pushed the piston 99 to the bottom of the well thus stripping or clearing the bladder B from the tire, the plunger retracts but not far enough to retract the tire chuck sectors 106. Steam in the meantime is evacuated from the vessel formed by the base 2 and head 3 and the press is now ready to open. The hydraulic cylinders 60 are now actuated to cause the clamps 4 to swing clear of the peripheral flange 84 of the head 3. When the lifting rod now secured to the head 3, the entire head is vertically elevated and lifted off the base 2. At the same time, the loading chuck 44 has entered the next tire band 9 to be cured and lifted to a position wherein it is vertically clear of the top of the base 2.

Because of the chuck segments 106 being beneath the upper bead of the tire T, the tire is caused to be lifted with the head 3 and the motor driven pinion 38 is now energized to cause the carriages 34 and 35 to travel to the left as seen in FIG. 2. When the green tire band 9 is vertically aligned with the bottom mold section 5, the carriage 35, 34 is stopped. The upper toe ring 113 is now moved downwardly to strip the tire T from the top mold section 6 and retraction of the plunger 98 will cause the sectors 106 to retract releasing the tire T onto the discharge conveyor 10. The drive 41 is then energized to move the green tire band 9 downwardly to the proper loading position with respect to the toe ring 102 and the bottom mold section 5.

With the green tire band 9 on or adjacent the bottom toe ring, the well 100 is then pressurized to elevate the piston 99 and the bladder may also be pressurized to cause the bladder to grip or engage the carcass. The piston-cylinder assembly 47 is then retracted and the loader 44 is elevated clear of the band 9. The drive pinion 38 is now reversely driven to cause the carriage 34, 35 to move back to the right as seen in FIG. 2 until the press head 3 is over the carcass or band 9 and the loader 44 is over the pilot 8. The drive 40 is now energized to cause the press head 3 to descend on top of the band. The inflated or partially inflated bladder within the carcass will hold the latter in proper position as the press head descends. Shaping pressure is now applied to the bladder and as the drive 40 causes the head 3 to descend, the band will be flattened out into tire shape.

Because the shaping pressure within the shaped or partially shaped tire will exert an upward force of, for example, approximately 80,000 pounds over and above the weight of the press head 3, the press head elevator must be capable of exerting a substantial downward force on the head. For this reason the crane 23 is mounted on rails on both the top and bottoms of the supporting beams 16 and 17 and the supporting columns for such beams are firmly anchored. When the shaping has been completed, shaping pressure is removed from the bladder and the piston-cylinder assemblies 60 are retracted to lock the clamps 4 in place. The sealing ring 111 is inflated to obturate the well 100 from the bladder curing medium and steam may also then be circulated through the vessel to obtain the desired vulcanizing temperature in the mold sections.

Following vulcanization, the seal 111 is deflated and the hot water within the bladder may then just simply flow to the bottom of the well. The plunger 98 then drives the piston to its lowermost position stripping the bladder from the tire to repeat the unloading and loading cycle above-described.

In FIGS. 8 and 9 there is illustrated a modified form of press utilizing a different form of clamp to hold the base and head together. The press head 120 comprises an annular bolster 121 which includes an upstanding cylindrical portion 122 having an annular cap 123 thereon. The upper mold section 124 is carried on sleeve 125 projecting from annular piston 126 surrounding plunger housing 127. A conical insulating shield 128 is provided over the bolster 121.

Projecting laterally from the bolster is a bracket 130 having a guide roller 131 thereon which cooperates with slot 132 in upstanding frame 133 on the base 134. This roller-slot construction may be employed to assist in the proper positioning of the press head over the press base by the elevator mechanism carried by the carriage 34.

The plunger 136 projecting from the plunger housing 127 includes an annular slot 137 which cooperates with followers 138 on bell cranks 139 pivoted to a spider 140 connected to the housing 127. The lower ends of the bell cranks carry inwardly projecting pins 141 and the spider, of course, carries the top toe ring 142. Accordingly, when the plunger is extended, the pins 141 will be moved to the right as seen in FIG. 9 and when the plunger is retracted, the pins will be moved to the left as seen in FIG. 9.

The bottom mold section 144 is supported on a table or platen 145 which is in turn supported on a plurality of pistons 146 in cylinders 147 in the base 134. Air under pressure may be supplied beneath the pistons 146 to provide a force clamping the mold sections together prior to the maximum clamping force being exerted by the clamps shown at 150. Each of the plurality of clamps 150 includes a relatively large screw 151 threaded through nut 152 which is journalled as indicated at 153 in sleeve 154. Secured to the nut 152 is a pinion 155 driven by ring gear 156 which, of course, is in mesh with the drive pinions of each of the clamps 150. The screw 151 includes a slot 157, a portion of which is in the form of a helix. The helix extends through a quadrant of 90° on the screw 151 and a fixed pin 158 is situated within the slot to limit rotation of the screw to that controlled by the slot. Accordingly, as the ring gear 156 drives the pinion to cause the screw 151 to move upwardly or downwardly, the pin and slot construction 158, 157 will rotate the screw about its own axis 90°. This then swings the top offset portion 159 of the clamp 150 either above or clear of the edge of the bolster 121. The offset portion 159 of the clamp includes an adjustable clamping element 160 which when the clamp is in clamping engagement will engage a wear pad 161 on the bolster 121. With the clamp in its elevated position, the offset portion 159 of the screw 151 will be swung clear of the press head so that the press head may be lowered into proper engagement with the base and, of course, the mold sections 124 and 144 into proper aligned position. As the ring gear 156 rotates the nut 152, the screw will be moved downwardly and in such downward movement, the pin and slot construction will cause the screw to rotate through 90° to position the element 160 over the wear pad 161.

When the mold halves 124 and 144 come together, an extensible heat shield will close the space between the bolster 121 and the platform of table 145. The shield is provided by cylindrical upstanding member 163 mounted on the platform 145 having telescoped thereover slidable shield 164. Springs 165 peripherally arranged about the shield assembly bear against flange 166 on the upper shield 164 and urge the latter to extended position.

The lower mold section 144 is provided with a toe ring 168 which is opposed to the upper toe ring 142 around which the lower bead 169 of the carcass 170 is positioned when the press is loaded. The shaping bladder 171 is secured at one end by spray ring 172 adjacent the toe ring 168. The other end of the bladder is secured to bladder piston 173 which includes a removable top 174. Peripherally pendantly secured to the bladder piston is a skirt 175 which slides up and down in the bladder well 176. On top of the bladder well 176 there is provided an annular seal assembly 177 which includes an inflatable sealing member 178 which cooperates with the skirt 175 in the elevated position of the bladder piston to obturate the well 176 so that the volume of curing medium circulated through the bladder during the vulcanizing portion of the cycle will be limited to that of the tire cavity rather than the cavity plus the volume of the well.

When the piston 173 is in its elevated position, the plunger 136 will be slightly retracted causing the bell cranks 139 and the pins 141 to be inserted in the recesses 179 provided therefor in their removable top 174 of the piston 173. In this manner the bladder piston is locked in its elevated position and in such position the sealing ring 178 will be inflated. The curing medium is then supplied into the bladder to pressurize the same through the spray ring 172.

A motor 190 drives through bevel gearing 191, screw 192 vertically to position platform 193 acting as a support or stop for shelf 194 extending inwardly from the bladder piston skirt 175. The platform 193 may act as an adjustable lower stop for the piston 173 and may also facilitate elevation of the bladder piston to be more conveniently accessible for changing of the bladder.

In operation, the crane 23 will be positioned over the press and at the conclusion of the vulcanizing cycle, the plunger 136 will be extended releasing the locking pins 141 from the bladder piston 173 and driving the latter down into the well 176 stripping the bladder 171 from the cured tire. The ring gear 156 will be driven to release the screw clamps 150 and as they are elevated, they will be swung clear of the press head. The crane then picks up the press head and the top mold section 124 as well as the plunger housing 127 will extend from the bolster 121 and the tire will remain in the top mold section 124 to be carried therewith. As soon as the guide rollers 131 have cleared the guide slot 132, the carriages 34, 35 will be shifted along the rails 31 and 32 to position the tire over the discharge conveyor and also to position the next band to be cured over the bottom mold section 144. Pressure may now be supplied beneath the piston 126 to cause the upper mold section 124 to be elevated with respect to the toe ring 142 stripping the tire from the upper mold section to fall upon the discharge conveyor. The relative movement between the bolster 121 and the upper mold section 124 may also be used to obtain radial movement of tread sectors if radial tires are being cured. With the next tire band 170 in place, the loader is, of course, retracted and the carriages 34, 35 are again actuated to position the press head over the base 134. Shaping pressure has now been supplied to the bladder 171 to cause the same to grip the interior of the carcass 170 and as the drive 40 moves the press head downwardly, the carcass will be pressed into tire shape. When the bolster 121 clears the offset portions 159 of the clamps 150, the overhead crane will then be released and is free to be shifted to perform the same opening, discharge and loading function for an other press. The loading piston-cylinder asemblies 146, 147 will push up against the upper mold to compensate at this time for the lack of proper clamping pressure and the clamps are now actuated firmly to supply the required pressures to compensate for the pressures obtained during the vulcanization. The bladder piston 173 is locked to the upper mold section and the seal 178 is inflated. Curing medium at high pressure is now introduced into the bladder to obtain the vulcanization of the tire.

It can now be seen that there is provided tire curing apparatus which does not require massive, complex and expensive individual mold opening, closing and loading mechanisms, but rather a single simplified mechanism for accomplishnig such functions with a plurality of tire presses. There is also provided a simplified automatic clamping mechanism for securely holding the mold sections together during the vulcanization of the tire. Further, with the bladder construction of the present invention, the advantages of the well type of bladder are maintained while the well is not required to be filled with the curing medium thus reducing the volume and heat energy required. With the apparatus and process disclosed above, more economical production of tires, especially large size tires can be obtained.

Other modes of applying the principles of the invention may be empolyed, change being made as regards the details described, provided the features stated in any of the following claims or the equivalent of such be employed.

I, therefore, particularly point out and distinctly claim as my invention:

1. Tire curing apparatus comprising a plurality of presses, first means to open and close one of said presses, the opening of said one of said presses permitting unloading a cured tire therefrom, and second means automatically to load a green tire in said one of said presses while open, and common support means for said first and second means maintaining a fixed relation between said first and second means during operation thereof and movable with respect to said presses to move said first and second means as a unit relative to said presses to perform the same function for each of said plurality of presses.

2. Tire curing press as set forth in claim 1 wherein said common support means comprises carriages for said first and second means interconnected for movement as a unit.

3. Tire curing press as set forth in claim 2 wherein said plurality of presses are aligned forming a row, and an overhead beam extends transversely of said row and movable along said row, said carriages being movable along said beam, and said first and second means comprise elevator means on said carriages, one of said elevator means being provided for opening and closing the presses, and the other elevator means being provided for loading the presses.

4. A tire curing press as set forth in claim 1 wherein each press comprises top and bottom mold sections, said first means including power means operative both to raise and lower said top mold section, said power means during lowering forcing said top mold section downwardly facilitating the shaping of a green tire within the press.

5. Tire curing apparatus as set forth in claim 1 wherein each press comprises top and bottom mold sections, said first means including a first mechanism operative to raise the top mold section of said one of said presses, said common support means being operative laterally to shift said first means and top mold section carried thereby while simultaneously positioning said second means and a green tire held thereby to be placed in loading position with respect to the bottom mold section of said one of said presses.

6. Tire curing press as set forth in claim 1 wherein each press comprises top and bottom mold sections, said common support means including a drive mechanism for laterally shifting said common support means to position said first means and top mold section of said one of said presses carried thereby for discharge of a cured tire therefrom when laterally of the respective bottom mold section.

7. Tire curing press as set forth in claim 1 wherein said common support means includes adjusting means to set the distance between said first and second means to accommodate different size tires.

8. Tire curing apparatus as set forth in claim 1 including a green tire support laterally of each of said presses, said first and second means comprising a pair of elevators, one for the press and one for such green tire, said elevators being spaced on said common support means the same distance as the press and its green tire support.

9. Tire curing apparatus as set forth in claim 8 wherein said elevators are connected together by said common support means and driven for movement in line with the press and its green tire support.

References Cited

UNITED STATES PATENTS

| | | | |
|---|---|---|---|
| 2,997,738 | 8/1961 | Soderquist | 18—2 |
| 3,137,032 | 6/1964 | MacMillan | 18—2 |
| 3,149,191 | 9/1964 | McFeaters et al. | 266—13 |
| 3,411,764 | 11/1968 | Falk et al. | 266—13 |

FOREIGN PATENTS

| | | |
|---|---|---|
| 802,014 | 9/1958 | Great Britain. |

J. HOWARD FLINT, JR., Primary Examiner

U.S. Cl. X.R.

18—2, 7